Dec. 8, 1925.　　　　　　　　　　　　　　　1,564,832
D. DANA
LUBRICATION OF BEARINGS
Filed July 20, 1922　　　2 Sheets-Sheet 1

Inventor,
Duncan Dana,
by [signature]
His Attorney.

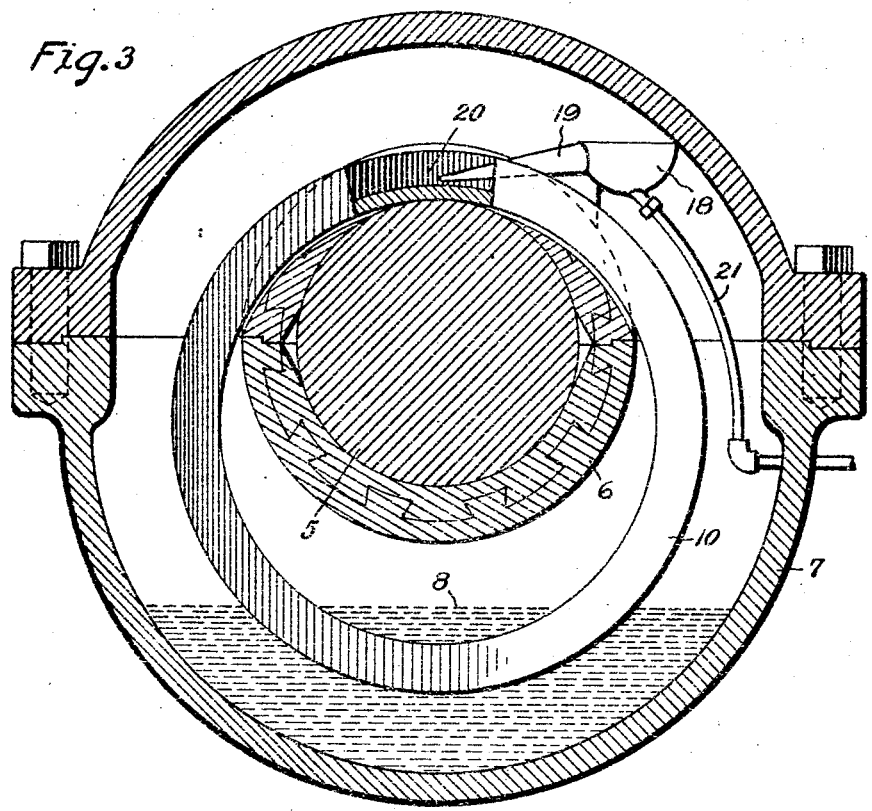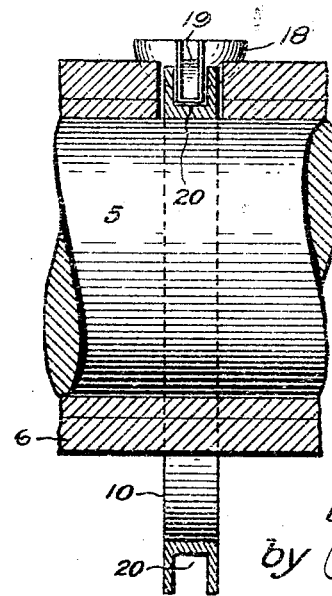

Patented Dec. 8, 1925.

1,564,832

UNITED STATES PATENT OFFICE.

DUNCAN DANA, OF MARBLEHEAD, MASSACHUSETTS, ASSIGNOR TO GENERAL ELECTRIC COMPANY, A CORPORATION OF NEW YORK.

LUBRICATION OF BEARINGS.

Application filed July 20, 1922. Serial No. 576,369.

*To all whom it may concern:*

Be it known that I, DUNCAN DANA, a citizen of the United States, residing at Marblehead, county of Essex, State of Massachusetts, have invented certain new and useful Improvements in Lubrication of Bearings, of which the following is a specification.

The present invention relates to the lubrication of bearings wherein oil rings are employed to carry oil from an oil well beneath a shaft up over the shaft to lubricate it.

The object of my invention is to provide an improved structure and arrangement wherein an oil ring in addition to carrying oil up over the shaft to lubricate it, serves also as a pump to supply oil to other parts requiring lubrication.

For a consideration of what I believe to be novel and my invention, attention is directed to the accompanying description and the claims appended thereto.

Figure 1:
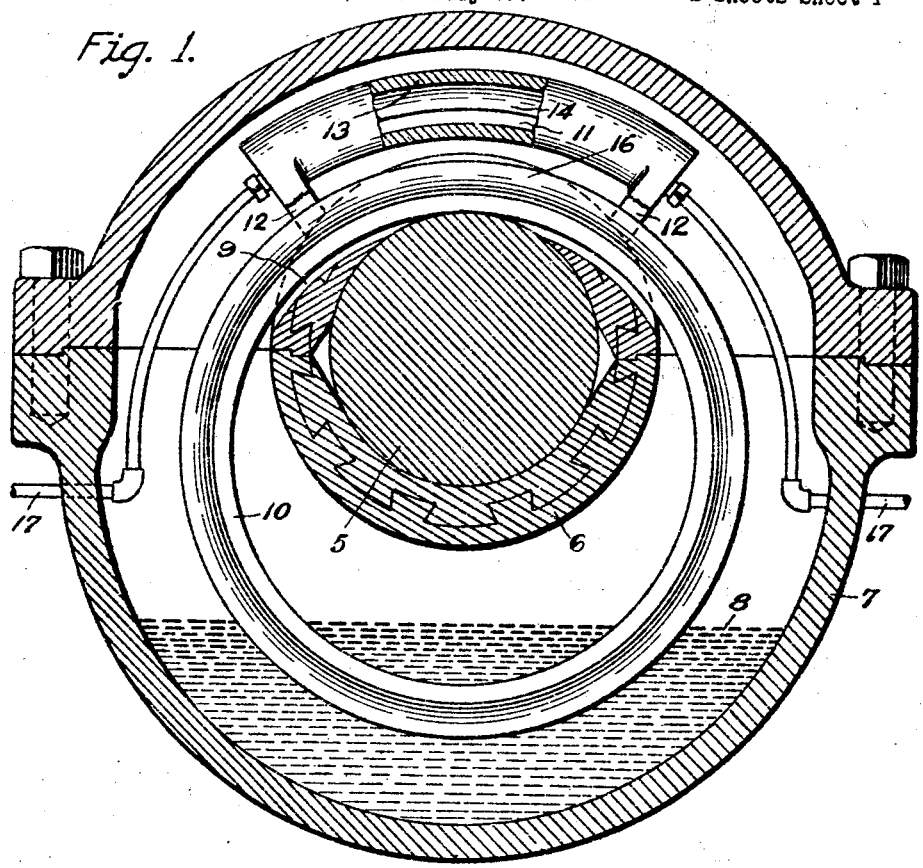
Figure 2:
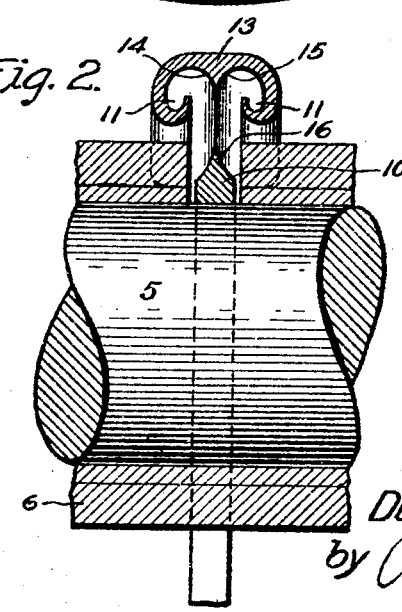

In the drawing, Fig. 1 is a transverse sectional view of a bearing provided with an oil ring lubricating arrangement embodying my invention; Fig. 2 is a longitudinal sectional view of certain parts shown in Fig. 1, and Figs. 3 and 4 are views similar to Figs. 1 and 2 of a modification.

Referring to the drawing, 5 indicates a shaft carried in a bearing 6 of suitable structure and supported in any suitable manner as by means of a pedestal (not shown). Surrounding the bearing is a housing 7 the lower portion of which forms a well for holding a supply of lubricant 8. In bearing 6 is a groove 9 in which an oil ring 10 runs, the lower portion of the ring reaching into lubricant 8. As is well understood, the rotation of the shaft causes the oil ring to turn or run on the shaft and in so doing it carries oil up into groove 9 from which groove the oil runs into the bearing to lubricate it.

According to my invention, I provide in connection with the oil ring and bearing, means forming a lubricant chamber, so arranged that the oil ring can pump lubricant into the chamber, and I then provide conduit means for conveying lubricant from such chamber to other points to be lubricated. In this way the oil ring serves the additional function of a lubricant pump.

In the arrangement shown in Fig. 1 the lubricant chamber comprises two spaced elongated channels, 11, one located on each side of oil ring 10 and facing upwardly. The channels extend crosswise of the shaft and are preferably curved so they are approximately concentric therewith. They are supported by feet 12 fixed to the bearing. Between the channels directly over the oil ring is a curved wall 13 shaped to direct lubricant striking it into channels 11. Wall 13 is preferably formed integral with the walls which form channels 11 whereby the channels and means for directing lubricant into them is a unitary structure. The curved wall 13 presents two curved surfaces 14 and 15 which meet to form a sharp edge directly over the oil ring and the outer edge of oil ring 10 is preferably beveled as indicated at 16 to provide a sharp edge in line with the sharp edge formed by surfaces 14 and 15. Connected to channels 11 are conduits 17 for conveying lubricant to any points desired, such as other parts of the same machine requiring lubrication.

In operation, the oil ring running on the shaft carries more or less oil up over the top of the shaft and some of this oil is thrown off by centrifugal force against curved surfaces 14 and 15 which direct it into channels 11 from whence it flows through conduits 17 to other parts to be lubricated. The sharp edge on the ring enables the oil to be more easily thrown off from the ring and also serves to direct it evenly to surfaces 14 and 15.

In Figs. 3 and 4 I have shown a modified arrangement wherein the oil chamber is in the form of a cup 18 from which extends a scoop 19, and the oil ring is provided in its outer surface with an annular circumferential groove 20 into which the end of scoop 19 projects. Groove 20 is deep and narrow so it will carry a suitable amount of oil up to the scoop, the exact dimensions depending, among other things, upon the viscosity of the oil. Connected to cup 18 is a conduit 21 for conveying lubricant to other parts to be lubricated. With this arrangement the oil carried up in groove 20 is caught by scoop 19 and conveyed to cup 18 from whence it flows out through conduit 21. The groove 20 will tend to run full of oil on account of centrifugal force, and this force is sufficient to force the oil up scoop 19 into cup 20.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. The combination with a shaft and a bearing having a groove and an oil ring which runs on the shaft in said groove and conveys lubricant directly to the bearing for lubricating it, of means forming a chamber for the reception of excess oil carried up by the ring, and a conduit for conveying oil from said chamber to other parts to be lubricated, whereby the excess oil carried up by the ring may be utilized for lubricating purposes.

2. The combination with a shaft and a bearing having a groove and an oil ring which runs on the shaft in said groove and conveys oil directly to the bearing for lubricating it, of a chamber located above the bearing, means for directing excess oil from the ring to said chamber, and a conduit for conveying oil from said chamber to other parts to be lubricated, whereby the excess oil carried up by the ring may be utilized for lubricating purposes.

3. The combination with a shaft and a bearing having an oil ring which runs on the shaft for conveying oil to the bearing for lubricating it, of a chamber located above the ring into which the ring throws oil by centrifugal force, and a conduit for conveying oil from said chamber to other parts to be lubricated, whereby the excess oil carried up by the ring may be utilized for lubricating purposes.

In witness whereof, I have hereunto set my hand this seventeenth day of July, 1922.

DUNCAN DANA.